United States Patent [19]

Weitkamp et al.

[11] Patent Number: 5,545,784
[45] Date of Patent: Aug. 13, 1996

[54] METHOD OF MODIFYING MOLECULAR SIEVES BY MEANS OF SOLID STATE ION EXCHANGE, AND A METHOD FOR HYDROGENATING OLEFINIC COMPOUNDS

[75] Inventors: Jens Weitkamp, Horo am Neckar; Stefan Ernst; Thomas Bock, both of Stuttgart; Thomas Kromminga, Worms; Akos Kiss; Peter Kleinschmit, both of Hanau, all of Germany

[73] Assignee: Degussa Aktiengesellschaft, Frankfurt, Germany

[21] Appl. No.: 419,896

[22] Filed: Apr. 11, 1995

Related U.S. Application Data

[62] Division of Ser. No. 197,481, Feb. 16, 1994, Pat. No. 5,434,114.

[30] Foreign Application Priority Data

Feb. 17, 1993 [DE] Germany ............... 43 04 821.8

[51] Int. Cl.$^6$ ............... C07C 5/03; C07C 5/08
[52] U.S. Cl. ............... 585/250; 585/277
[58] Field of Search ............... 585/250, 277

[56] References Cited

U.S. PATENT DOCUMENTS

5,434,114  7/1995  Weitkamp et al. ............... 502/74

Primary Examiner—Asok Pal
Attorney, Agent, or Firm—Beveridge, DeGrandi, Weilacher & Young, L.L.P.

[57] ABSTRACT

Molecular sieves are modified by an ion exchange process where metal cations are introduced into the molecular sieves by means of solid state ion exchange. The solid state ion exchange can be carried out as follows: a weighed amount of calcined and activated zeolite is intimately mixed with a precalculated amount of $PtCl_2$, $PdCl_2$, $RhCl_3$, $CuCl_2$, $V_2O_5$ or another compound of the noble metals (e.g., corresponding halides or oxides), the solids mixture is then heated in a current of inert gas (e.g., a current of helium gas or of nitrogen) to temperatures of 400° to 600° C., then cooled down to room temperature and subsequently reduced in a current of hydrogen for 10 to 14 hours at 280° to 350° C. in order to produce small metal clusters from the cationically introduced metal.

1 Claim, 8 Drawing Sheets

METHOD OF MODIFYING MOLECULAR SIEVES BY MEANS OF SOLID STATE ION EXCHANGE, AND A METHOD FOR HYDROGENATING OLEFINIC COMPOUNDS

This is a divisional of application Ser. No. 08/197,481, filed on Feb. 16, 1994, now U.S. Pat. No. 5,434,114.

INTRODUCTION AND BACKGROUND

The present invention relates to a method of modifying molecular sieves by means of solid state ion exchange and the modified molecular sieves produced thereby. In a more detailed aspect, the present invention relates to hydrogenation catalysts selective as to the form of product produced and a method for hydrogenating olefinic compounds to form alkanes using said catalysts.

A known method for introducing noble metals such as platinum or palladium into medium-pored and wide-pored zeolites is by way of ion exchange in aqueous suspension with the appropriate tetraammine complexes (e.g., $Pt(NH_3)_4Cl_2$ or $Pd(NH_3)_4Cl_2$). This method yields a high distribution of the noble metal in the crystallite interior of wide-pored zeolites (e.g., Y) and medium-pored zeolites (e.g., ZSM-5).

However, small-pored zeolites (e.g., ZSM-58, zeolite A) cannot be doped in this manner with platinum or palladium because the noble-metal complex is too bulky to be able to diffuse into the eight-membered ring channels of these zeolites. The only known method for introducing noble metals into the interstices of small-pored zeolites is to add the noble-metal complex in the desired amount to the synthesis gel for the zeolite production prior to crystallization so that the zeolite crystallizes around the complex (P. B. Weisz and V. J. Frilette, J. Phys. Chem. (1960), volume 64, page 382; P. B. Weisz et al., J. Catal. (1962), volume 1, pages 307–312). A shape-selective hydrogennation catalyst can be produced in a known manner by introducing for example $Pt(NH_3)_4Cl_2$ into the synthesis gel for zeolite A.

The known method for doping small-pored zeolites has the disadvantage that it is not universally applicable to all zeolite types. The presence of slight amounts of impurity, as in this instance the noble-metal complex, in the synthesis gel hinders the crystallization of the desired zeolite.

SUMMARY OF THE INVENTION

An object of the present invention is to provide a method for modifying molecular sieves which is characterized in that cations are introduced into the molecular sieves by means of solid state ion exchange. Zeolites, especially small-pored zeolites, can be used as the molecular sieves in accordance with the invention. Cations of a metal from the first to the eighth subgroups of the Periodic Table can be used as cations; in particular, cations of the elements platinum, palladium, molybdenum and/or vanadium can be used. Another object of the present invention is to provide the modified molecular sieves produced by such a method.

Still a further object of the present invention is to provide shape selective hydrogenation catalysts and a method for hydrogenating olefinic compounds to form alkanes using said catalysts.

The above and other objects of the present invention can be achieved by a process of solid state ion exchange that can be carried out as follows: a weighed amount of calcined and activated zeolite is intimately mixed with a precalculated amount of $PtCl_2$, $PdCl_2$, $RhCl_3$, $CuCl_2$, $V_2O_5$ or another compound of the noble metals (e.g., corresponding halides or oxides) containing the noble metal, the resulting solids mixture is then heated in a current of inert gas (e.g., a current of helium gas or of nitrogen) to temperatures of 400° to 600° C., then cooled down to room temperature and subsequently reduced in a current of hydrogen for 10 to 14 hours at 280° to 350° C. in order to produce small metal clusters from the introduced metal cations. The flow rate of hydrogen can vary, but typically is about 15 cm³/min.

BRIEF DESCRIPTION OF THE DRAWINGS

The present invention will be further understood from a study of the drawings, wherein.

DETAILED DESCRIPTION OF THE INVENTION

The principle of solid ion exchange is known as is shown in H. G. Karge and H. K. Beyer in "Zeolite Chemistry and Catalysis", P. A. Jacobs et al., editor, pp. 43–64, Studies in Surface Science and Catalysis, vol. 69, Elsevier, Amsterdam, Oxford, New York, Tokyo (1991), which are relied on and incorporated by reference in their entirety.

The method of the present invention can be used with advantage with the following small-pored molecular sieves or zeolite types:

Zeolite ZSM-58 (described in EP 193,282), molecular sieves with the structure of zeolite A (e.g., zeolite Alpha described in U.S. Pat. No. 3,375,205) or SAPO-42 (described in U.S. Pat. No. 4,440,871), zeolite Rho (described, among other places, in J. Catal. (1988), volume 113, pages 367–382), and zeolite ZK-5 (described in U.S. Pat. No. 3,720,753). U.S. Pat. Nos. 3,375,205; 3,720,753; and 4,440,871 are incorporated by reference in their entirety. In general, the term "fine-pored" or "small-pored" zeolite is a material the pores of which are formed by eight-membered oxygen rings (viz., rings made up of eight $TO_4$-tetrahedra).

In order to be able to distinguish qualitatively between metal clusters within the pore system versus metal clusters on the outer crystallite surface of the zeolite, the well known educt-selective catalytic hydrogenation introduced by Dessau (R. M. Dessau, J. Catal. (1982), volume 77, pages 304–306), for example, can be used wherein a mixture of the same amounts of substance of a straight chain and of a bulky alkene (e.g., hexene-(1) or pentene-(1) and 2,4,4-trimethyl-pentene-(1)) is used.

The method for modifying molecular sieves by means of solid state ion exchange is characterized in that cations are introduced into the molecular sieves by means of solid state ion exchange. Such a process of solid state ion exchange can be carried out as follows: a weighed amount of calcined and activated zeolite is intimately mixed with a precalculated amount of $PtCl_2$, $PdCl_2$, $RhCl_3$, $CuCl_2$, $V_2O_5$ or another compound of the noble metals (e.g., corresponding halides or oxides) containing the noble metal, the resulting solids mixture is then heated in a current of inert gas (e.g., a current of helium gas or of nitrogen) to temperatures of 400° to 600° C., then cooled down to room temperature and subsequently reduced in a current of hydrogen for 10 to 14 hours at 280° to 350° C. in order to produce small metal clusters from the introduced metal cations. The flow rate of hydrogen can vary, but typically is about 15 cm$^3$/min.

Concerning the precalculated amount of $PtCl_2$, $PdCl_2$, $RhCl_3$, $CuCl_2$, $V_2O_5$ or another compound of the noble metals (e.g., corresponding halides or oxides) containing the noble metal, it is assumed that virtually all of the metal offered during the step of solid state ion exchange is exchanged into the zeolite; thus, the amount of the metal salt to be used for reaching the desired metal loading can be calculated on the basis of simple chemical stoichiometry.

Calcined and activated zeolites used herein as starting materials are well known to those skilled in the art. In general, calcination involves treatment of the zeolite at elevated temperatures (e.g., 400° to 600° C.) in an oxygen containing atmosphere to burn off organic materials (e.g., templates) occluded in the voids of the zeolite. In general, activation involves rendering the zeolite active for adsorptive or catalytic applications (e.g., desorption of water at elevated temperatures; decomposition of $NH_4^+$ ions in a zeolite at elevated temperatures to yield the Brönsted acid H$^+$ form). In many instances, calcination and activation are separate steps. However, if there are no alkali cations present in the zeolite, calcination and activation (viz., decomposition of the template and formation of acid sites) may occur simultaneously (i.e., the organic template is burnt off and leaves behind a proton).

If the metal introduced via solid state ion exchange is an oxidation catalyst (e.g., a metal known to be active as an oxidation catalyst, for example Cu, Co, Pt, Pd, Ru, Rh, Fe and others), the test reaction can be carried out for example with a gaseous mixture consisting of an n-alkane and a strongly branched isoalkane with air or oxygen as carrier gas.

The exchanged molecular sieves or zeolites (e.g., hydrogenation catalyst) produced in accordance with the method of the present invention are distinguished in that in the test reaction they hydrogenate the alkene and oxidize the n-alkane with high selectivity. Surprisingly, as a result of the method of the present invention, the predominant part (>60%, preferably >70%) of the introduced metal is located in the pores and interstices of the small-pored zeolites; only these molecular sieves are suitable as catalyst for form-selective, metal-catalyzed reactions. By comparison, small-pored zeolites produced in a known manner (i.e., charged with metal by means of ion exchange in aqueous suspension) are not form-selective; the metal is located on the outer surface of the zeolite crystallites and is therefore also freely accessible for bulky molecules.

The modified molecular sieve produced by the method of the present invention may be a hydrogenation catalyst. Such hydrogenation catalysts may be utilized in a method for hydrogenating olefinic compounds to form alkanes involving hydrogenating olefinic compounds with the hydrogenation catalyst. The size of the individual zeolite crystallites is usually 0.5 to 5 µm. For the catalytic experiments, the crystallites are pressed without any binder, crushed and sieved to a size fraction between 0.3 and 0.5 mm. However, it is expected that similar results can be obtained if the catalysts are agglomerated using a binder or different shapes of the pellets. The useful pore size depends on the size of the feed olefin. In the examples, most zeolites are those having small pores (eight-membered rings) or medium pores (ten-membered rings) zeolites. For the conversion of bulkier molecules, even large pore (twelve-membered rings) zeolites may be useful.

EXAMPLES

Example 1

It is advantageous to first prepare the Brönsted acid (H$^+$-) form of the zeolite and to subject this to solid state ion exchange in accordance with the present invention; in this way, the metal cation is introduced into the zeolite and HCl is produced, no residual cations remain in the zeolite.

Zeolite ZSM-58 with a modulus of (n $SiO_2$/n $Al_2O_3$)=50 is synthesized according to EP 193,282 with methyltropinium iodide as template, subsequently calcined 16 hours at 540° C. in air, and then subjected to a multiple ion exchange in aqueous suspension with a large excess of $NH_4NO_3$ solution. The Brönsted acid (H$^+$-) form is obtained by the subsequent calcination at 550° C.; from it, approximately 0.5 g (dry mass) at a time is treated for 12 hours at 550° C. in a current of helium ($V_{He}$=33 cm$^3$/min.). Then the zeolite activated in this manner is intimately mixed at room temperature under inert gas with 0.007 g $PtCl_2$ or 0.009 g $PdCl_2$ to carry out the solid state ion exchange. The mixture is heated in a dry current of helium ($V_{He}$=33 cm$^3$ /min.) at a rate of 3K/min. to 550° C. (with $PtCl_2$) and 480° C. (with $PdCl_2$). Two moles HCl gas are produced per mole $PtCl_2$ and $PdCl_2$ exchanged during the solid state ion exchange. The development of HCl is followed differentially with a thermal-conductivity detector or a mass spectrometer and integrally by absorption of the hydrogen chloride in demineralized water via the increase of the electric conductivity of the absorption liquid; such methods are well known in the art. After termination of the solid state ion exchange the hydrochloric acid produced is titrated with 0.01 m NaOH solution and bromothymol blue as indicator. The results are presented in table 1:

TABLE 1

| MeCl$_2$ | n MeCl$_2$, in, mol | n Cl$^-$, out, mol | m Me/m Z % |
|---|---|---|---|
| PtCl$_2$ | 2.6 × 10$^{-5}$ | 5.1 × 10$^{-5}$ | 1.0 |
| PdCl$_2$ | 5.1 × 10$^{-5}$ | 1.1 × 10$^{-4}$ | 1.2 |

MeCl$_2$: metal (Me) salt used
n MeCl$_2$, in: weighed-in amount of MeCl$_2$ substance
n Cl$^-$, out: titrated amount of chloride ion substance
m $_{Me}$/m $_Z$: charge of the dry zeolite with metal after the solid ion exchange It is apparent from the data in table 1 that the solid state ion exchange occurs practically totally at the amount ratios used here and under the conditions employed. The exchanged zeolites contain 1.0% by weight $PtCl_2$ or 1.2% by weight $PdCl_2$.

Example 2

Brönsted acid centers arise in the reduction of the metal cations with hydrogen introduced by solid ion exchange into the zeolites; such centers can catalyze undesired side reactions under reaction conditions (e.g., isomerization or cracking). In order to avoid this, all catalysts are rinsed before the start of the tests for 15 minutes at reaction temperature with pure ammonia, which poisons the acidic centers; otherwise, Brönsted acid sites may catalyze undesired side reactions (e.g., double bond isomerization or skeletal isomerization).

Zeolite HZSM-58 is exchanged in accordance with the method described in example 1 via solid state ion exchange with platinum or palladium. The noble-metal contents are 1.0% by weight Pt and 0.54% by weight Pd. The exchanged zeolites are reduced at 300° C. in a current of hydrogen. The acidic centers produced thereby are poisoned by rinsing with ammonia at 110° C. and tested in the hydrogenation of the hexene-(1)/2,4,4-trimethylpentene-(1) mixture under the following typical conditions:

| Reaction temperature: | $T = 50$ to $110°$ C. |
|---|---|
| Modified dwell time: | $W/F_{olefines} \approx 3$ to $30$ g · h/mole |
| Partial hydrogen pressure: | $p_H \approx 100$ kPa, |
| Partial pressure of the alkenes: | $P_{olefines} = 7$ to $14$ kPa |
| Catalytic mass (dry): | $W = 0.50$ g |

Figure 1:
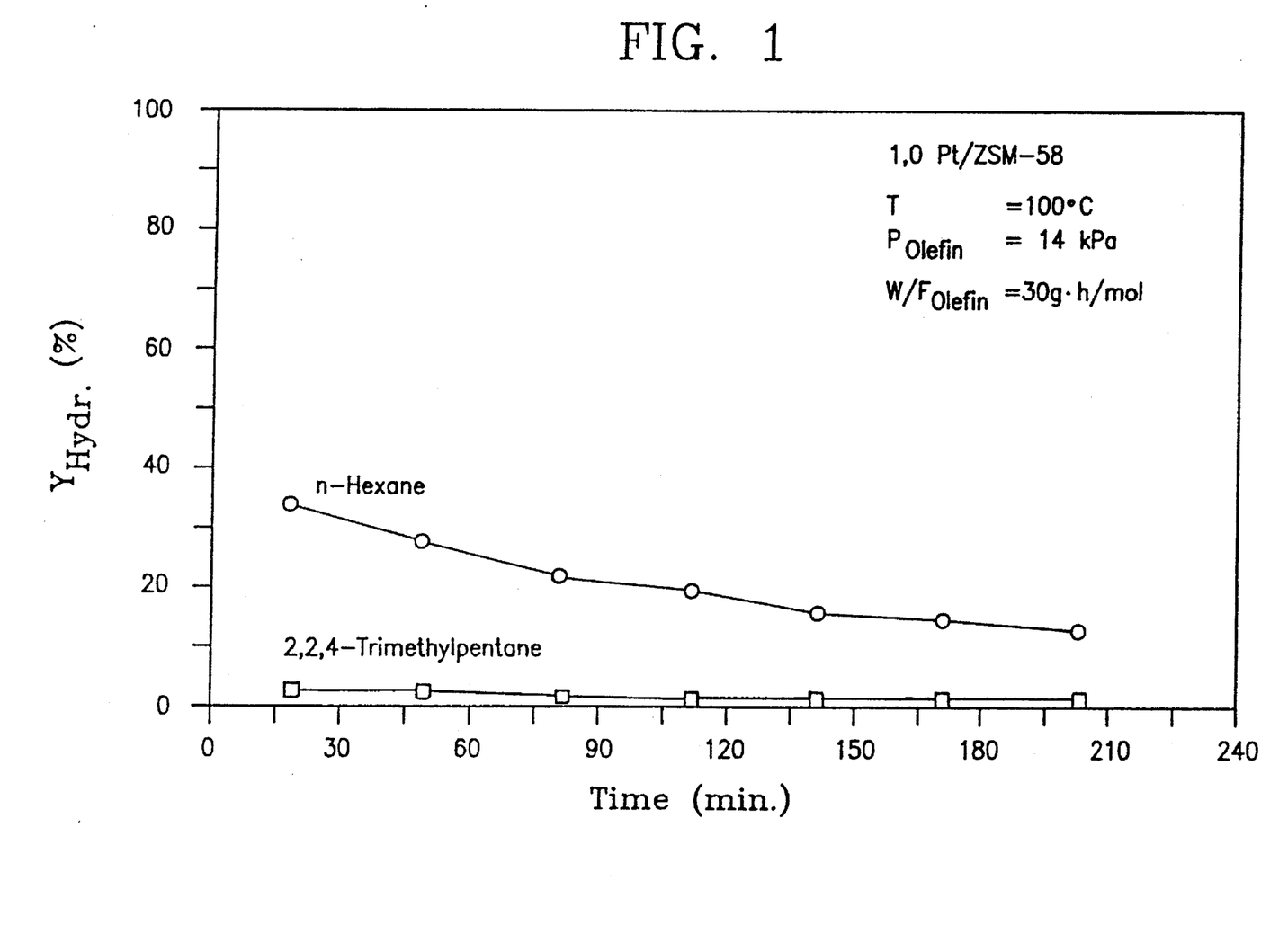
FIG. 1 is a graph which shows yields of n-hexane and 2,4,4-trimethylpentane in the conversion of the hexene-(1)/2,4,4-trimethylpentene-(1) mixture on 1.0 Pt/ZSM-58 with $n_{Sf}/n_{Af}=50$.
Figure 2:
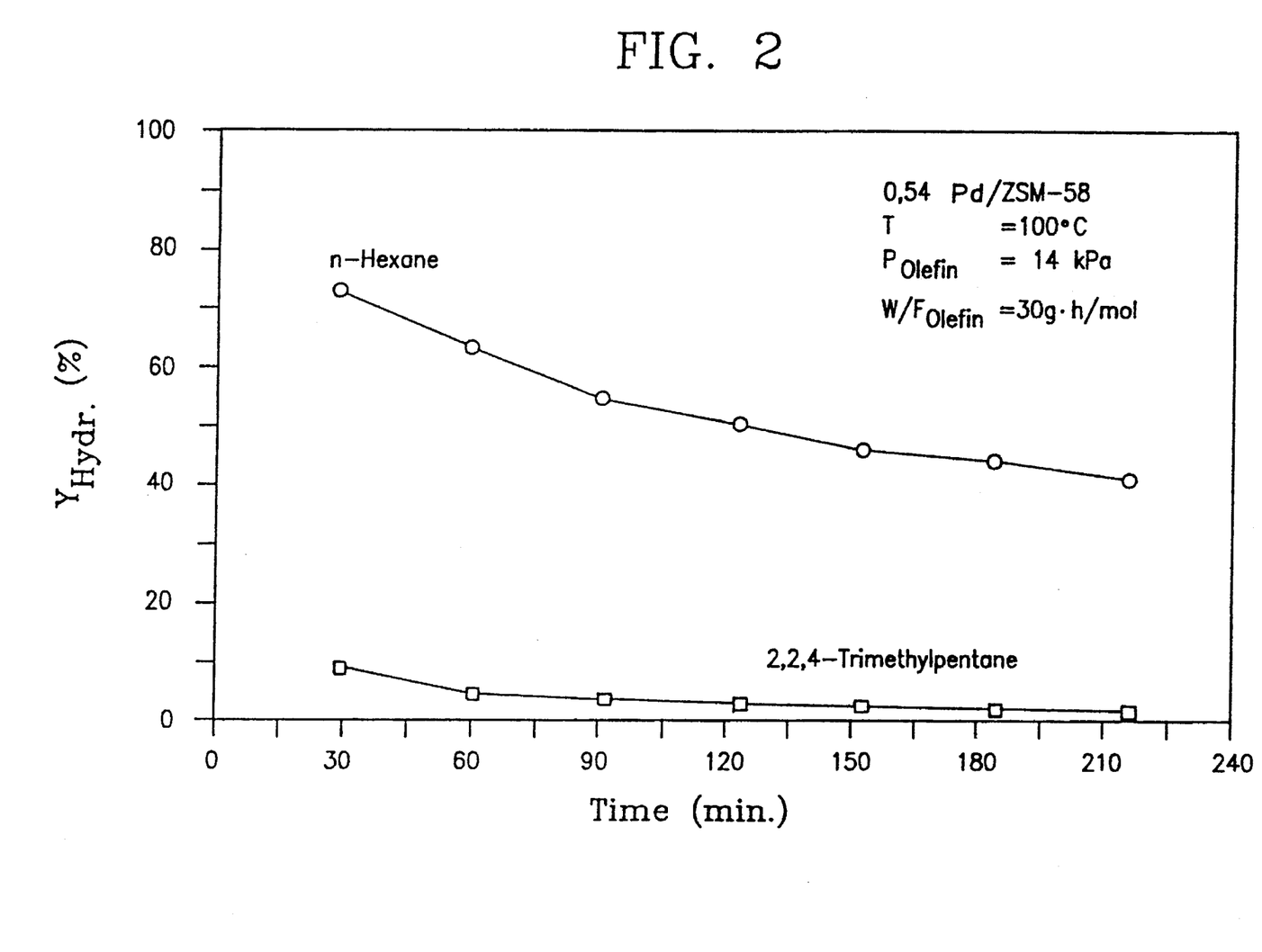
FIG. 2 is a graph which shows yields of n-hexane and 2,2,4-trimethylpentane in the conversion of the hexene-(1)/2,4,4-trimethylpentene-(1) mixture on 0.54 Pd/ZSM-58 with $n_{Sf}/n_{Af}=50$.
Figure 3:
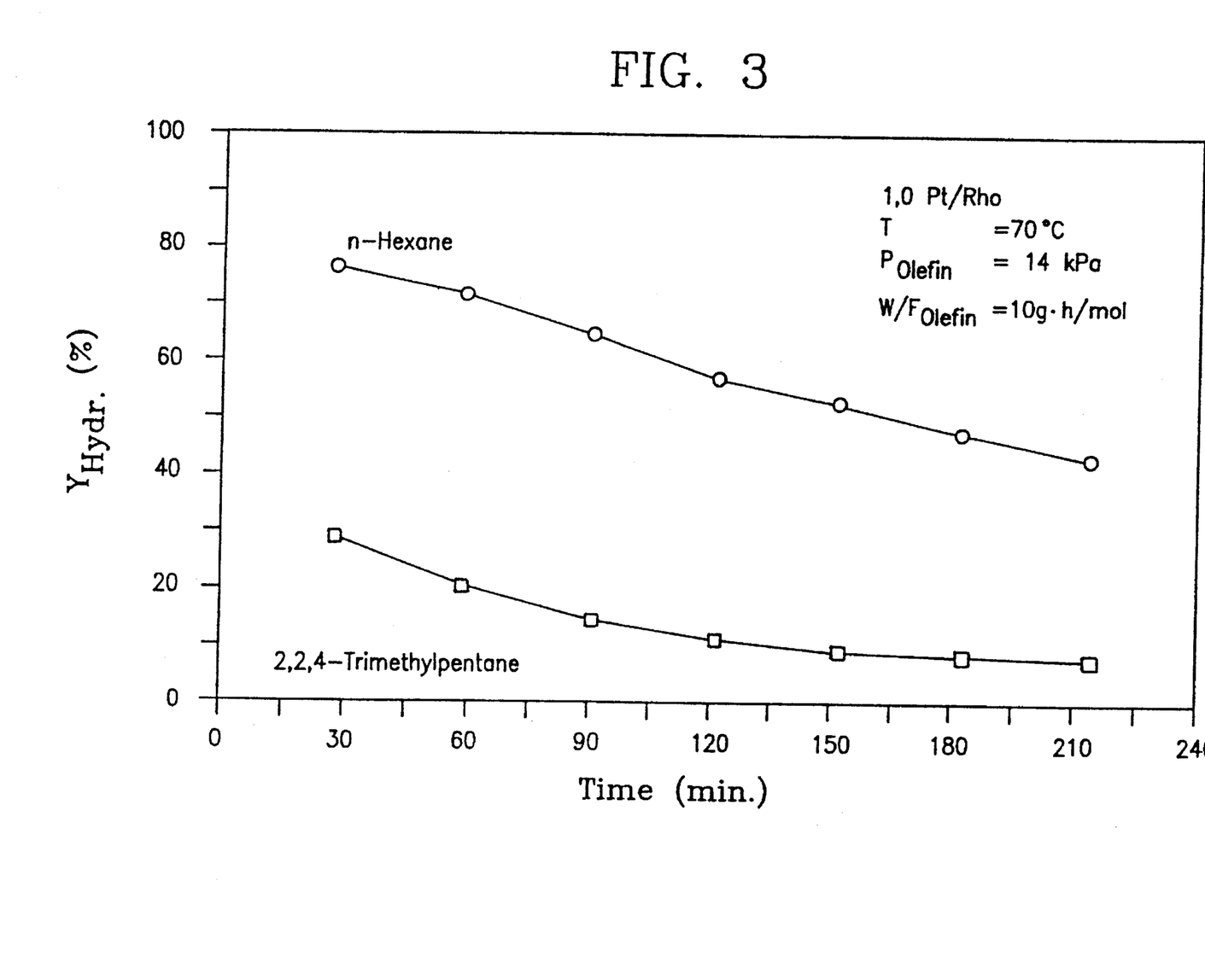
FIG. 3 is a graph which shows yields of n-hexane and 2,2,4-trimethylpentane in the conversion of the hexene-(1)/2,4,4-trimethylpentene-(1) mixture on 1.0 Pt/Rho.
Figure 4:
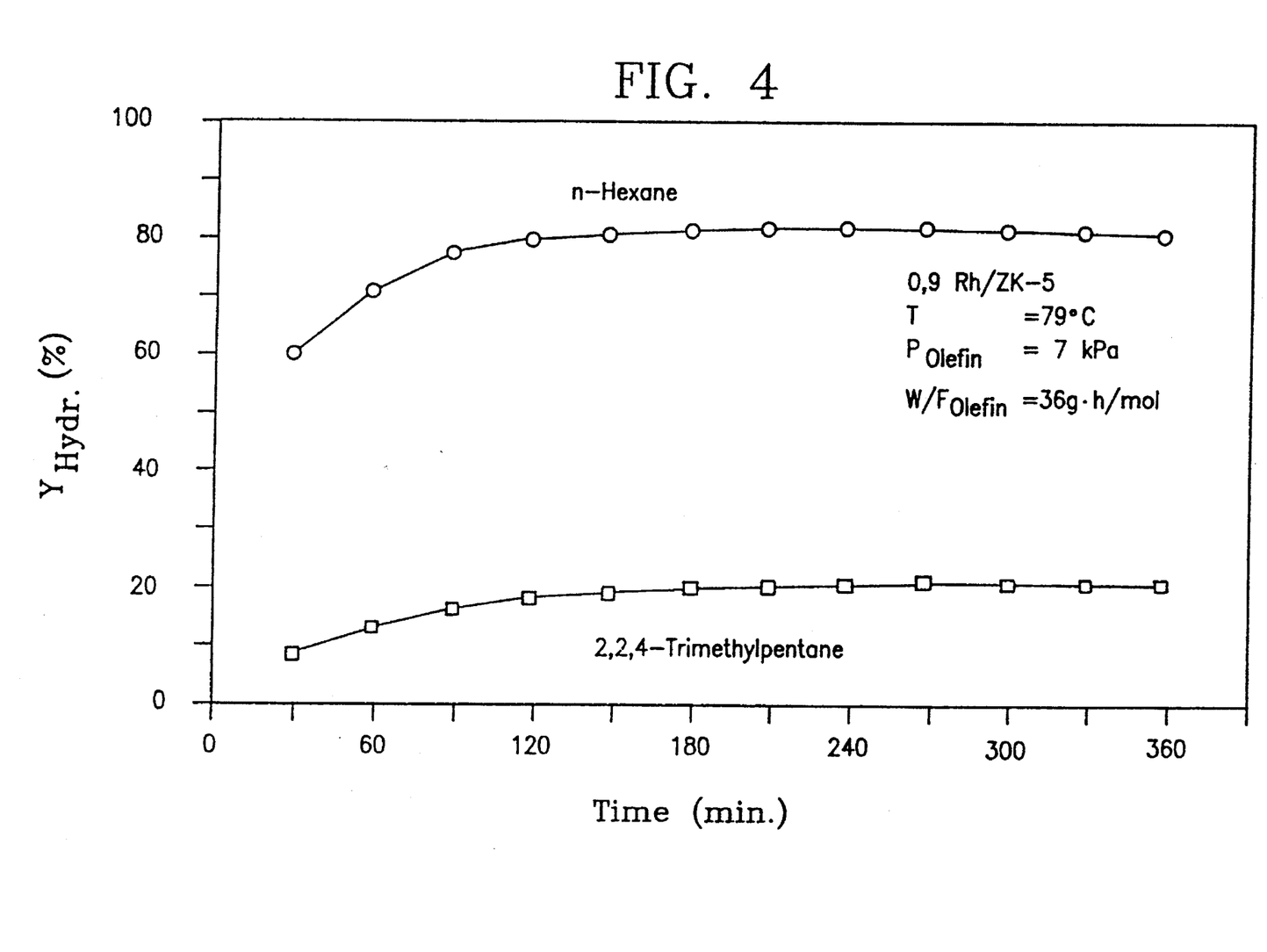
FIG. 4 is a graph which shows yields of n-hexane and 2,2,4-trimethylpentane in the conversion of the hexene-(1)/2,4,4-trimethylpentene-(1) mixture on 0.9 Rh/ZK-5.
Figure 5:
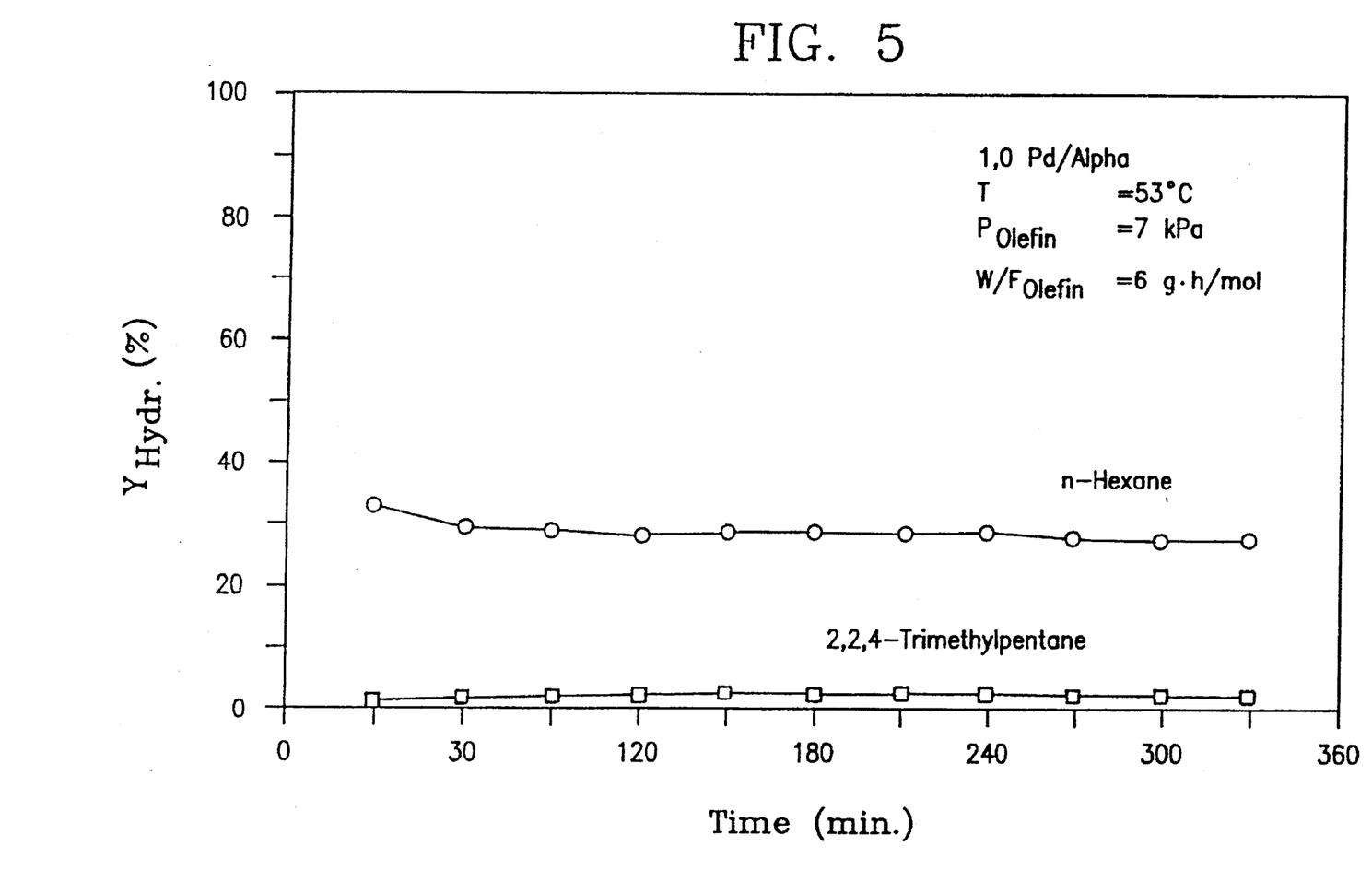
FIG. 5 is a graph which shows yields of n-hexane and 2,2,4-trimethylpentane in the conversion of the hexene-(1)/2,4,4-trimethylpentene-(1) mixture on 1.0 Pd/Alpha.
Figure 6:
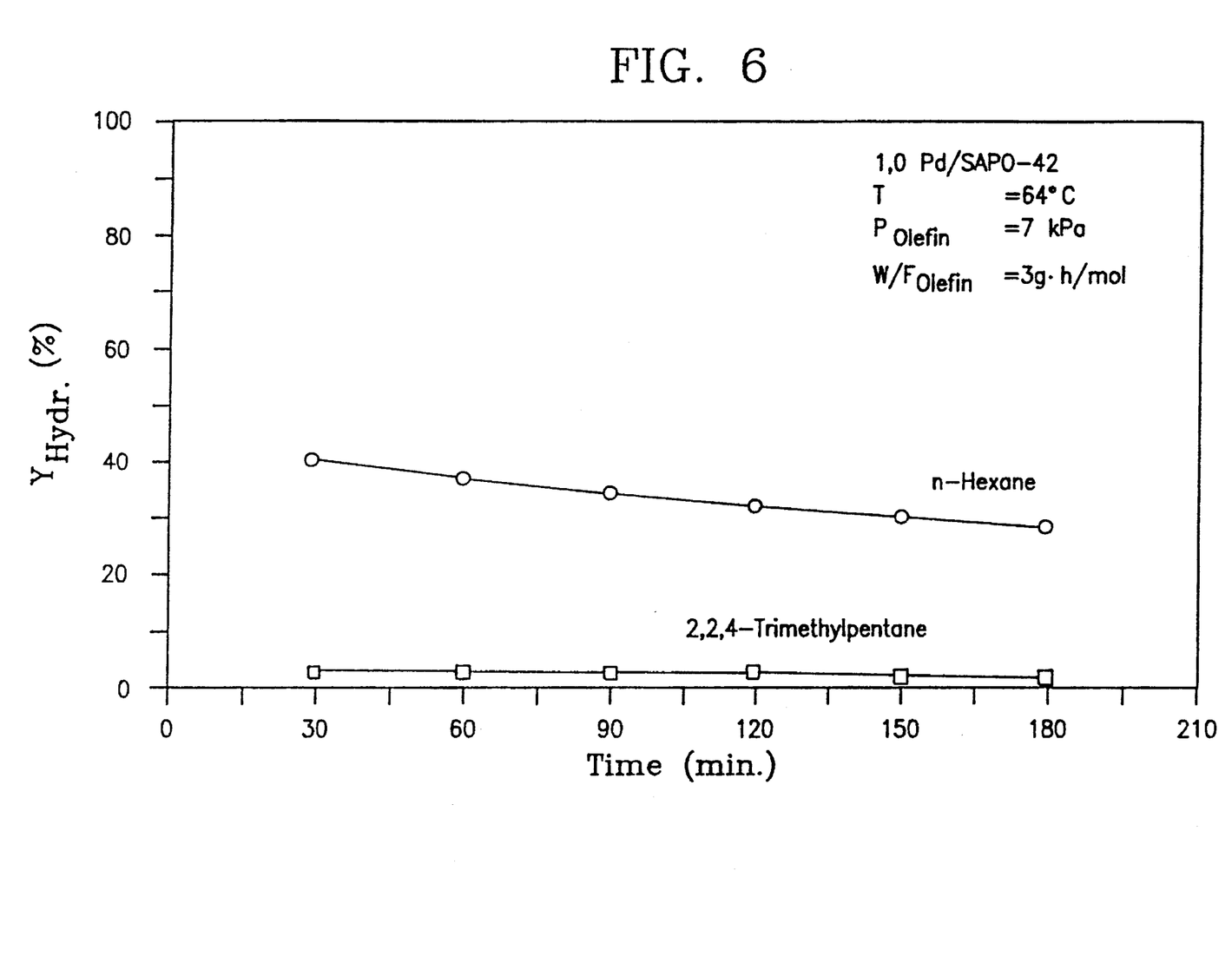
FIG. 6 is a graph which shows yields of n-hexane and 2,2,4-trimethylpentane in the conversion of the hexene-(1)/2,4,4-trimethylpentene-(1) mixture on 1.0 Pd/SAPO-42.
Figure 7:
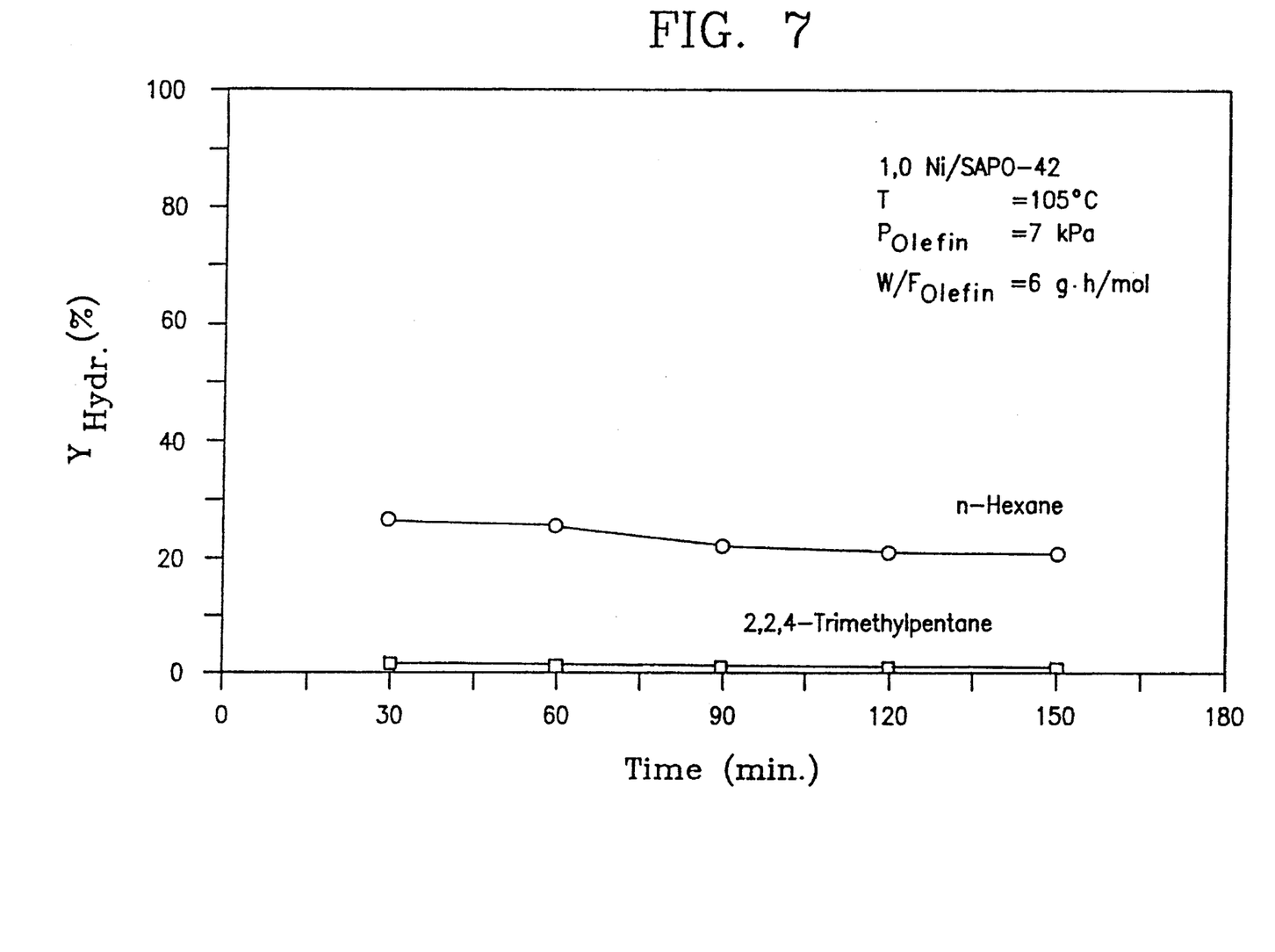
FIG. 7 is a graph which shows yields of hydrogenation products in the hydrogenation of the hexene-(1)/2,4,4-trimethylpentene-(1) mixture on 1.0 Ni/SAPO-42 (produced by solid state ion exchange of SAPO-42 with $NiCl_2$)

The results of the catalytic tests are shown in FIGS. 1 and 2. The yields of the hydrogenation products n-hexane and 2,4,4-trimethylpentane are plotted as a function of the time. It is apparent that the hydrogenation of hexene-1 is strongly preferred on both catalysts. The introduction of platinum and palladium via solid state ion exchange into small-pored zeolite ZSM-58 and the production therewith of a form-selective hydrogenation catalyst was therefore successful.

Conventional equipment used for hydrogenation can be used for purposes of the present invention. The olefin is contacted with the hydrogenation catalyst of the invention in the customary fashion known in the art.

Example 3 (reference example)

Zeolite HZSM-58 is replaced via ion exchange in aqueous solution of Pt(NH$_3$)$_4$Cl$_2$ and Pd(NH$_3$)$_4$Cl$_2$ with 2% by weight platinum and 1.1% by weight palladium (corresponding to the same substance amounts of Pt and Pd). For the ion exchange in aqueous solution, approximately 5 g zeolite are suspended in 200 cm$^3$ water in each instance. To this end approximately 100 cm$^3$ water are added drop by drop over a period of 3 hours under constant agitation in which water a precalculated amount of the noble-metal complex is dissolved. The suspension is subsequently agitated for a further 24 hours and then evaporated to low bulk in a rotary evaporator until dry. The powder obtained in this manner is dried overnight at 120° C. in a drying oven.

It is necessary in the method described here for introducing noble metal via ion exchange with aqueous solutions of the tetraammine complexes to first break down the exchanged noble-metal complex by an $O_2$ treatment before the reduction in the current of $H_3$ if a good dispersion of the noble-metal complex is to be assured (cf. P. Gallezot, Catal. Rev.-Sci. Eng. (1979), volume 20, pages 121–154). The exchanged zeolite is treated for 16 h at 300° C. in a current of oxygen ($V_{O_2}$=16 l/h) and then for 16 h at 300° C. in a current of hydrogen ($V_H$=6 l/h). The exchanged zeolites are subsequently tested in the catalytic hydrogenation of the mixture of the same amounts of substance of hexene-(1) and 2,4,4-trimethylpentene-(1) as described in example 2. Both olefines are 100% hydrogenated on both catalysts under the conditions described above. It is therefore not possible to produce a form-selective hydrogenation catalyst by means of ion exchange in aqueous solution.

Examples 4 to 9

Zeolite Rho is synthesized as described in J. Catal. (1988), volume 113, pages 367–382. Zeolite ZK-5 is synthesized according to U.S. Pat. No. 3,720,753 and zeolite Alpha according to U.S. Pat. No. 3,375,205. The synthesis of SAPO-42 takes place according to U.S. Pat. No. 4,440,871. These zeolites are, as described in example 1, calcined, converted by means of ion exchange in aqueous solution into the ammonium form and by means of subsequent calcination into the H$^-$ form and subsequently used in the solid state ion exchange. The amounts and the type of metal salt used, the amount of recovered chlorine substance as well as the metal charging of the zeolite achieved after the reduction in a current of hydrogen, which takes place in the manner described in example 1, are collected in table 2.

TABLE 2

Solid ion exchange of different small-pored zeolites with different metal salts or metal oxides

| Example | Zeolite | Metal Salt | n Me, in, mole | n Cl$^-$, out, mole | m Me/m Z % | Figure |
|---|---|---|---|---|---|---|
| 4 | Rho | PtCl$_2$ | 2.6 · 10$^{-5}$ | 5.2 · 10$^{-5}$ | 1.0 | 3 |
| 4 | ZK-5 | RhCl$_3$ | 4.9 · 10$^{-5}$ | 1.3 · 10$^{-4}$ | 0.9 | 4 |
| 6 | Alpha | PdCl$_2$ | 4.8 · 10$^{-5}$ | 9.6 · 10$^{-5}$ | 1.0 | 5 |
| 7 | SAPO-42 | PdCl$_2$ | 4.8 · 10$^{-5}$ | 9.6 · 10$^{-5}$ | 1.0 | 6 |
| 8 | SAPO-42 | NiCl$_2$ | 8.4 · 10$^{-5}$ | 1.6 · 10$^{-4}$ | 1.0 | 7 |
| 9 | SAPO-42 | NiO | 8.5 · 10$^{-5}$ | — | 1.0 | 8 |

It is clear that in all instances the solid state ion exchange takes place practically completely and metal charges of approximately 1% by weight are achieved. The results of the conversion of the hexene-(1)/2,4,4-trimethylpentane-(1) mixture on the catalysts produced in accordance with the present invention are shown in FIGS. 3 to 8. In all instances the hydrogenation of the hexene-1 is strongly preferred (i.e., the predominant portion of the introduced metal is located in the zeolite pores). In addition to the hydrogenation, an isomerization of the double bond on the metal takes place on the catalysts containing palladium and nickel, at which time the n-hexene-(1) is converted to a far greater extent than the bulky 2,4,4-trimethylpentene-(1).

Figure 8:
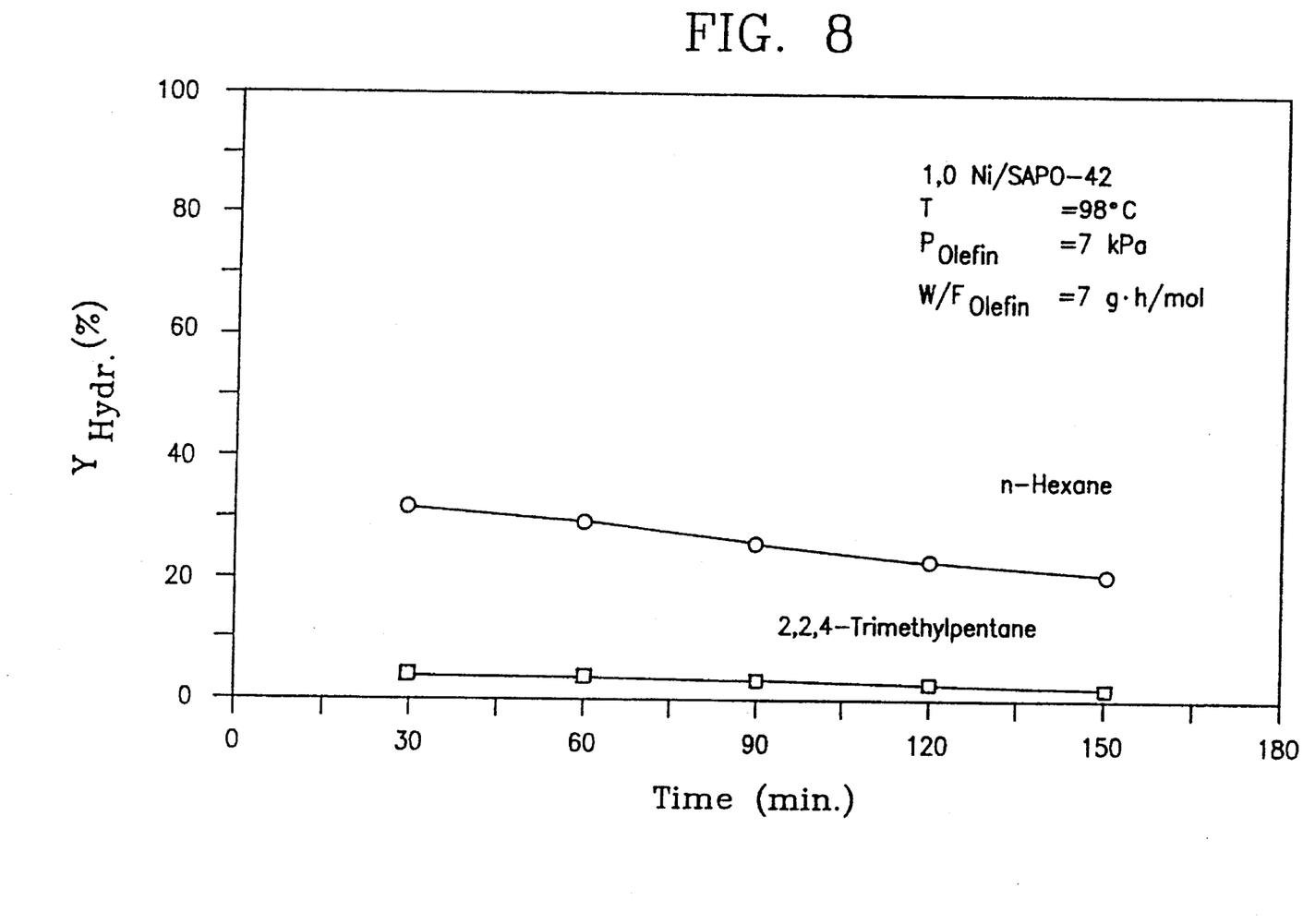
FIG. 8 is a graph which shows yields of hydrogenation products in the hydrogenation of the hexene-(1)/2,4,4-trimethylpentene-(1) mixture on 1.0 Ni/SAPO-42 (produced by solid state ion exchange of SAPO-42 with NiO).

It is apparent from table 2 and FIG. 8 that the solid state ion exchange can be carried out not only with metal halides but also with metal oxides. This makes it possible to carry out the solid ion exchange even without the release of HCl gas, which can potentially be damaging for certain zeolites.

Further variations and modifications of the foregoing will be apparent to those skilled in the art and such variations and modifications are attended to be encompassed by the claims that are appended hereto.

German Priority Application P 43 04 821.8 filed on Feb. 17, 1993 is relied on and incorporated by reference.

What is claimed:

1. A method for hydrogenating olefinic compounds to form alkanes comprising hydrogenating an olefinic compound by contacting said olefinic compound with hydrogen in the presence of a hydrogenation catalyst comprising a modified molecular sieve produced by a method comprising mixing a calcined and activated zeolite with a sufficient amount of a metal compound to form a solids mixture, heating said solids mixture in a current of inert gas to form a heated solids mixture, cooling said heated solids mixture to form a cooled solids mixture and subsequently reducing said cooled solids mixture in a current of hydrogen to produce small metal clusters from the cationically introduced metal, wherein said zeolite is a small-pored zeolite selected from the group consisting of zeolite ZSM-58, zeolite SAPO-42, zeolite Rho, and zeolite ZK-5.

* * * * *